(12) United States Patent
Hirota

(10) Patent No.: US 8,319,741 B2
(45) Date of Patent: Nov. 27, 2012

(54) DISPLAY DEVICE, COVER BODY OF DISPLAY DEVICE AND MANUFACTURING METHOD OF THE DISPLAY DEVICE

(75) Inventor: Mitsuo Hirota, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 916 days.

(21) Appl. No.: 12/412,317

(22) Filed: Mar. 26, 2009

(65) Prior Publication Data
US 2009/0244025 A1 Oct. 1, 2009

(30) Foreign Application Priority Data
Mar. 28, 2008 (JP) ................................. 2008-088195

(51) Int. Cl.
*G06F 3/041* (2006.01)
*H01J 9/00* (2006.01)
(52) U.S. Cl. ......................................... 345/173; 445/24
(58) Field of Classification Search .................. None
See application file for complete search history.

(56) References Cited

U.S. PATENT DOCUMENTS

| 5,175,873 A * | 12/1992 | Goldenberg et al. ......... 455/351 |
| 7,312,984 B2 * | 12/2007 | Richardson et al. ..... 361/679.41 |
| 7,630,200 B1 * | 12/2009 | Eldershaw ............... 361/679.57 |
| 2009/0323264 A1 * | 12/2009 | Eldershaw ............... 361/679.01 |

FOREIGN PATENT DOCUMENTS

| JP | H11-098853 A | 4/1999 |
| JP | 2000-249596 A | 9/2000 |
| JP | 2005-209868 A | 8/2005 |
| JP | 2005-266890 A | 9/2005 |

OTHER PUBLICATIONS

Japan Patent Office, Office Action for Japanese Patent Application No. 2008-088195, mailed Jun. 29, 2010.

\* cited by examiner

*Primary Examiner* — K. Wong
(74) *Attorney, Agent, or Firm* — Baker Botts L.L.P.

(57) ABSTRACT

In manufacturing a display device which includes a display panel, a touch panel mounted on a surface side of the display panel, and a cover body having an open portion in which the touch panel is held, an edge peripheral portion of the touch panel is welded to a brim portion of the open portion of the cover body by melting the brim portion of the open portion of the cover body such that the brim portion has a large thickness compared to a portion around the brim portion thus forming a thick wall portion having a large thickness compared to the portion around the thick wall portion and a mounting portion on which the edge peripheral portion of the touch panel is mounted on the brim portion of the opening of the touch panel.

8 Claims, 9 Drawing Sheets

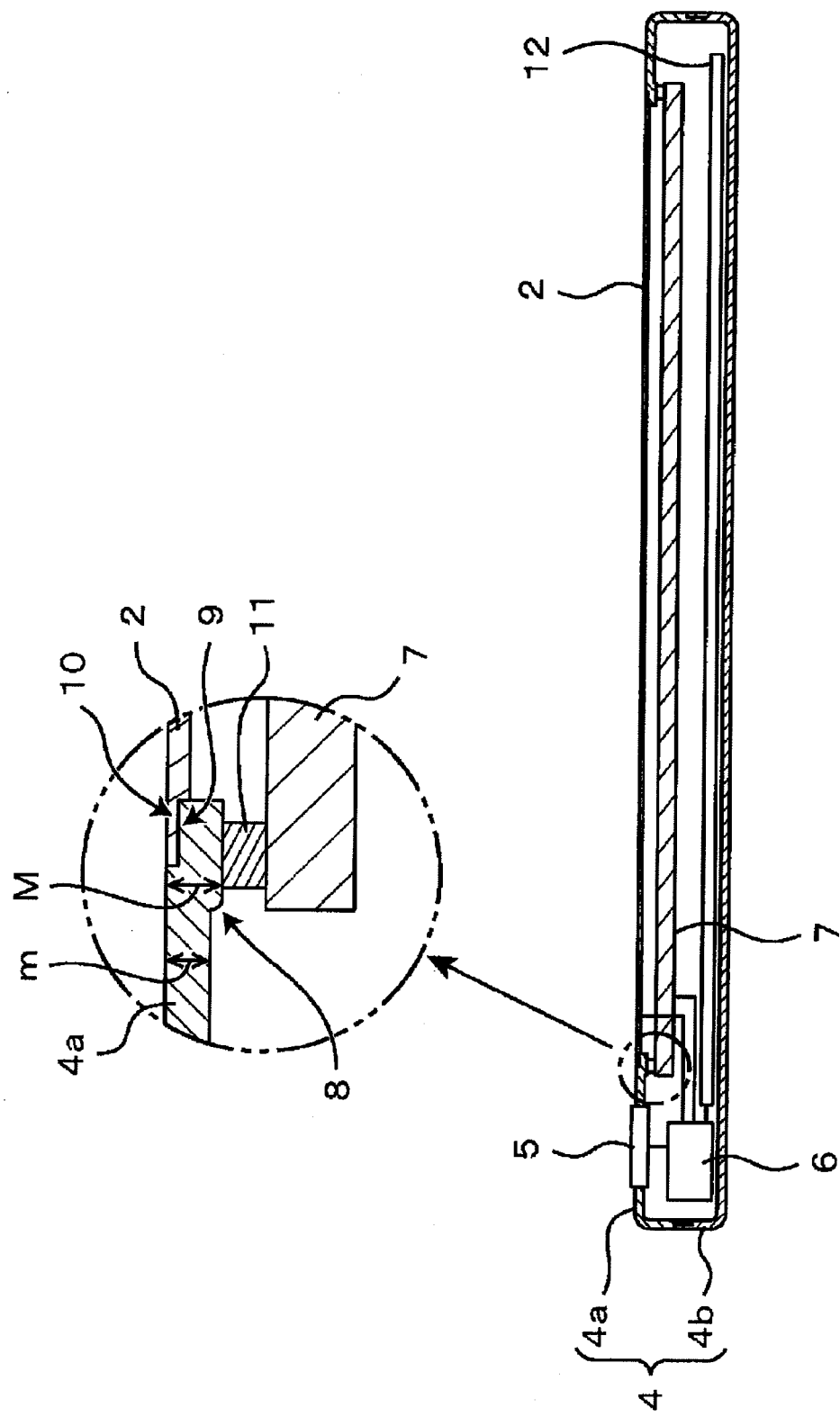

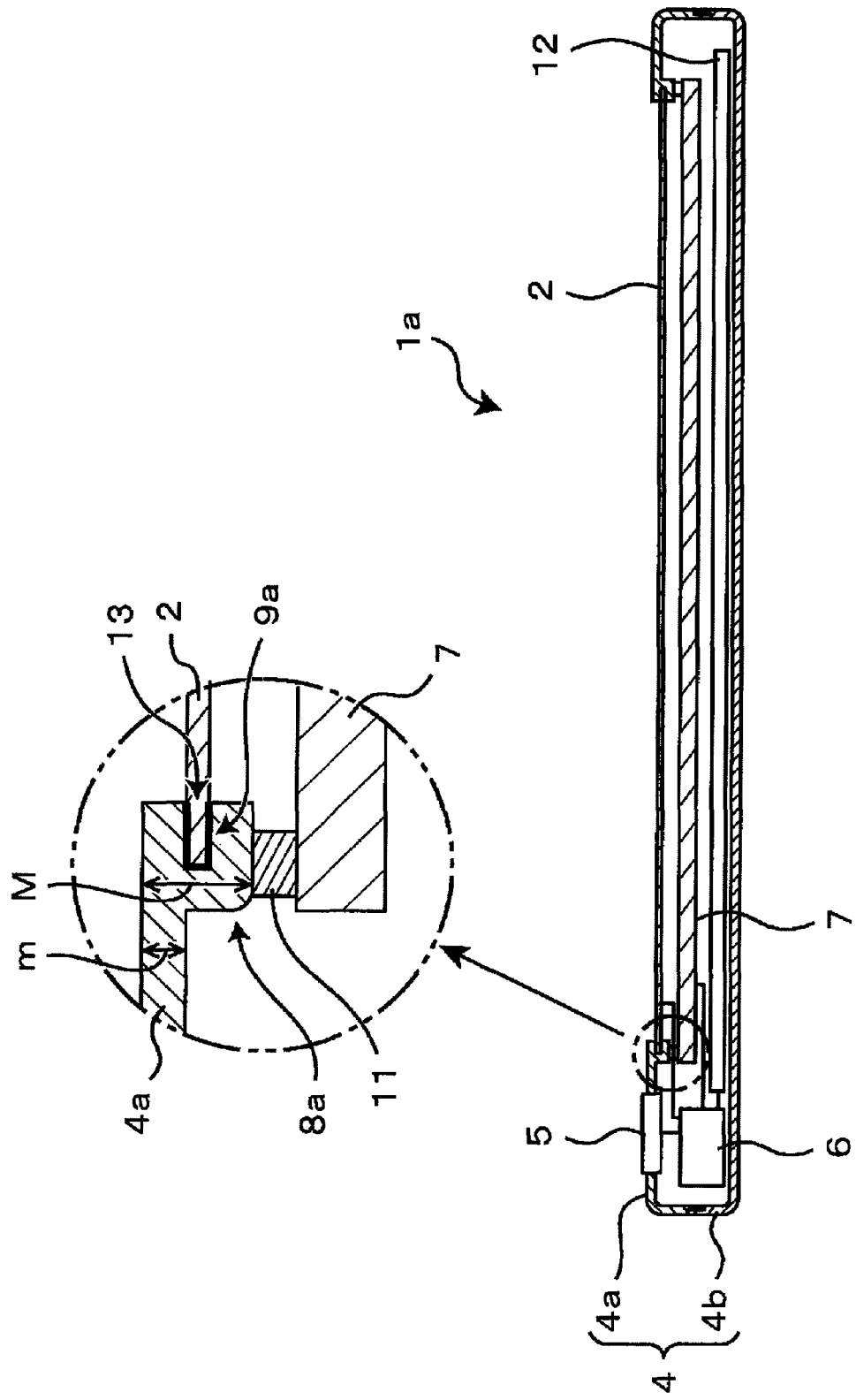

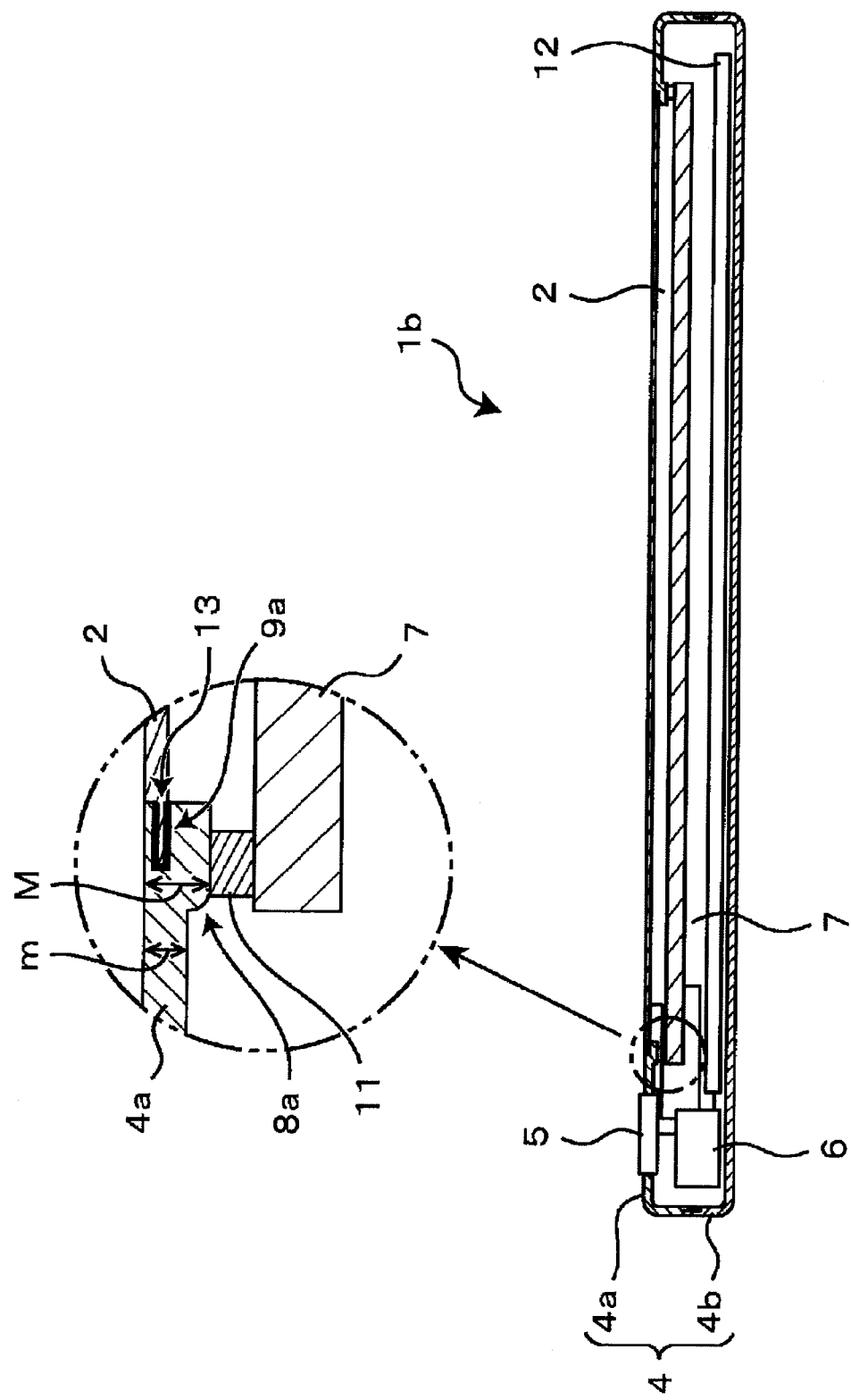

DISPLAY DEVICE, COVER BODY OF DISPLAY DEVICE AND MANUFACTURING METHOD OF THE DISPLAY DEVICE

CROSS-REFERENCE TO RELATED APPLICATION(S)

This application is based on and claims the benefit of priority from Japanese Patent Application No. 2008-088195 filed on Mar. 28, 2008; the entire contents of which are incorporated herein by reference.

BACKGROUND

1. Field

The present invention relates to a display device, a cover body of the display device and a manufacturing method of the display device, and more particularly to a display device which mounts a touch panel on a display panel thereof, a cover body which holds the touch panel of the display device, and a manufacturing method of the display device.

2. Description of the Related Art

Conventionally, a touch-panel-type display device which includes a touch panel besides a display panel has been popularly known, and has been adopted by various equipment such as an ATM (Automatic Tellers Machine), a PDA (Personal Digital Assistant), a portable gaming machine, a personal computer, a control panel of electric equipment and the like (see JP-A-11-98853), for example).

This type of display device also has a function of an inputting device in addition to a display function and hence, the convenience of a user can be enhanced. Further, the display device has other advantages including an advantage that desired inputting button switches can be easily displayed using control software.

With respect to the constitution of the touch-panel-type display device, there has been disclosed and proposed electronic equipment which includes, in general, a cover body having an opening for display, a transparent touch panel which is arranged corresponding to the opening of the cover body, and a display panel which is arranged on a back surface of the touch panel (JP-A-2005-209868, for example).

SUMMARY

However, in adopting the touch-panel-type display device in a thin device such as an electronic paper, there is no other way but to make the cover body thin and hence, the device is easily twisted when a user carries or operates the device. When the cover body is twisted, there may be a case that a position of the touch panel or the display panel mounted on the cover body is displaced thus giving rise to a possibility that quality of the display device is deteriorated.

For example, when the positional relationship between the opening of the cover body and the touch panel is displaced, there may be a case where a portion of the touch panel is concealed behind the cover body thus forming a region where the user cannot operate the touch panel. Further, the displacement of the positional relationship between the touch panel and the display panel may give rise to a possibility that the touch panel cannot be accurately operated.

Accordingly, it is an object of the present invention to provide a display device, a cover body of the display device and a manufacturing method of the display device which can enhance the quality of the display device by suppressing twisting which may occur in a thin display device.

According to a first aspect of the present invention, there is provided a display device which includes a display panel, a touch panel which is mounted on a front-surface side of the display panel, and a cover body which holds the touch panel, wherein the cover body includes a portion with an opening (hereinafter referred to as an open portion) in which the touch panel is mounted, and forms a thick wall portion having a large thickness compared to a portion around a brim portion of the open portion and a mounting portion on which an edge peripheral portion of the touch panel is mounted on the brim portion of the open portion.

According to another aspect of the present invention, there is provided a cover body of a display device, wherein an open portion in which the touch panel is mounted is formed in a region of the cover body where the open portion overlaps with a display region of the display panel, and a thick wall portion having a large thickness compared to a portion around the thick wall portion and a mounting portion on which an edge peripheral portion of the touch panel is mounted are formed on a brim portion of the open portion.

According to still another aspect of the present invention, there is provided a manufacturing method of a display device comprising: a step of mounting a cover body for holding a touch panel which is mounted on a surface of a display panel on the touch panel, wherein an edge peripheral portion of the touch panel is welded to a brim portion of the open portion of the cover body while melting the brim portion of the open portion such that the brim portion has a large thickness compared to a portion around the brim portion.

BRIEF DESCRIPTION OF THE DRAWINGS

FIG. 2 is a cross-sectional explanatory view taken along a line A-A' in FIG. 1 including a partially enlarged view showing a cross section of an edge peripheral portion of a touch panel;

FIG. 3A and FIG. 3B are cross-sectional explanatory views including partially enlarged views showing cross sections of edge peripheral portions of touch panels of display devices according to modifications of the embodiment of the present invention.

DETAILED DESCRIPTION

Hereinafter, one embodiment of the present invention is explained in conjunction with drawings. Here, the explanation is made by taking an electronic book which displays book data stored therein as an example of a display device.

Figure 1:
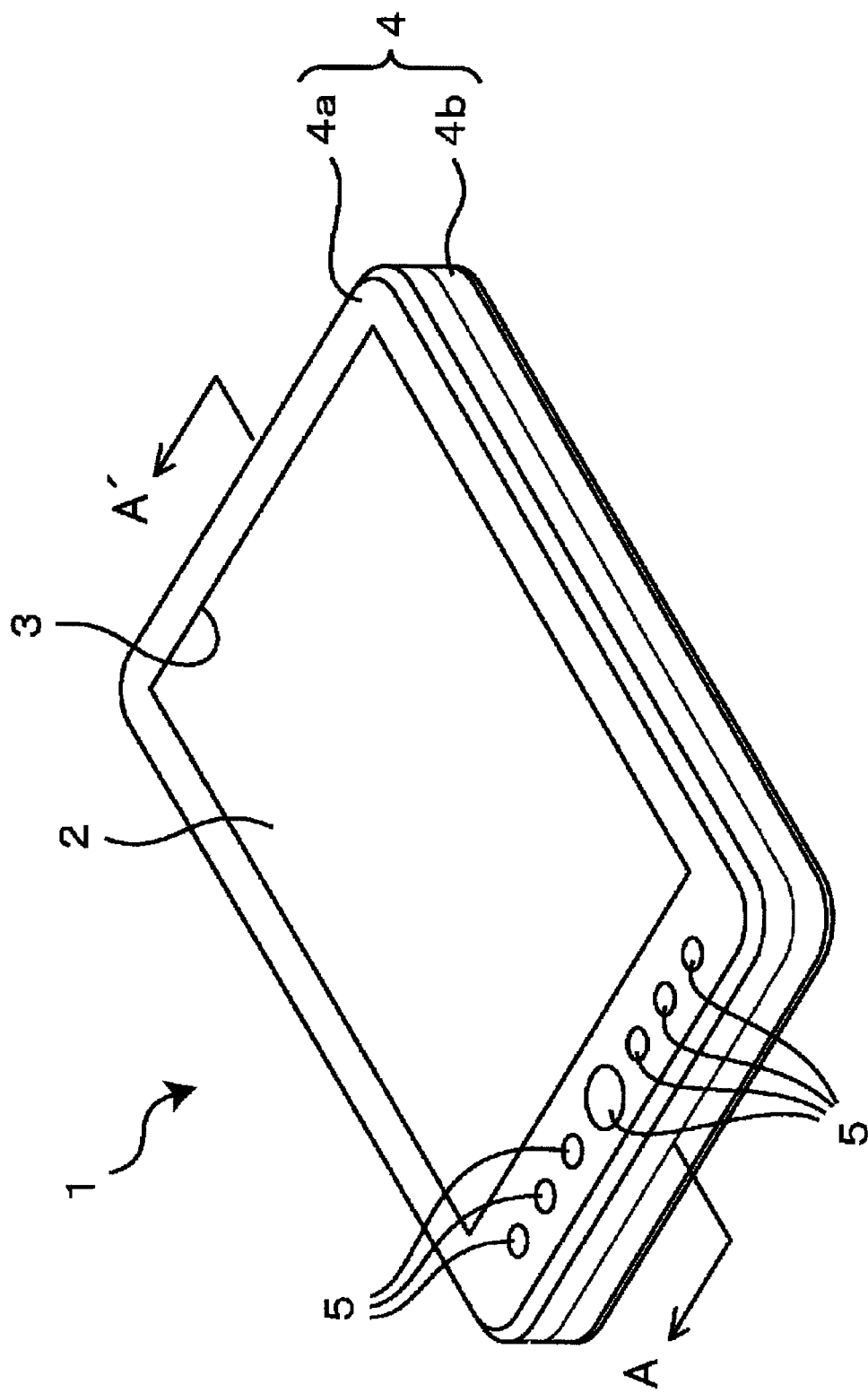
FIG. 1 is an explanatory perspective view showing a display device according to an embodiment of the present invention.

FIG. 1 is a perspective explanatory view of a display device according to this embodiment (hereinafter referred to as "electronic book"). FIG. 2 is a cross-sectional explanatory view taken along a line A-A' in FIG. 1 including a partially enlarged view showing a cross section of an edge peripheral portion of a touch panel, FIG. 3A and FIG. 3B are partially enlarged views showing cross sections of edge peripheral portions of touch panels of electronic books according to modifications of this embodiment, FIG. 4 is a cross-sectional explanatory view showing some of the manufacturing steps of the electronic book according to this embodiment.

As shown in FIG. 1, an electronic book 1 according to this embodiment includes a cover body 4 which is constituted of an upper cover body 4a having an open portion 3 which mounts a touch panel 2 on an upper surface thereof, and a lower cover body 4b. As shown in FIG. 1, operation button switches 5 which constitute an operation unit operated by a user are mounted on the cover body 4. The user operates the operation button switches 5 for allowing a control part 6 described later to perform starting of the electronic book 1 and various functions that the electronic book 1 possesses.

The electronic book 1 includes, as shown in FIG. 2, in the inside of the cover body 4, a control part 6 having a memory unit which stores plural kinds of book data and a control unit which systematically controls an operation of the whole electronic book 1, a display panel 7 which constitutes a display unit for displaying the book data, an operation screen and the like based on a control performed by the control part 6, a touch panel 2 which is arranged on a front-surface side of the display panel 7, and outputs signals for allowing the control part 6 to execute predetermined functions to the control part 6 when the user touches a predetermined positions on an operation screen, and a printed circuit board 12 for performing a display control.

Further, this electronic book 1 is configured such that when the user operates the operation button switch 5 or touches a predetermined position of the touch panel 2 on the operation screen, desired book data is selectively displayed on the display panel 7 whereby the user can enjoy reading.

This electronic book 1 has a small thickness as a whole as shown in FIG. 2 by taking convenience in carrying the electronic book 1 into consideration. However, in case the whole device has a small thickness, when a force (mechanical load) is applied to the electronic book 1 in a direction that the electronic book 1 is curved from the outside in use or in carrying the electronic book 1, there may be a possibility that the device is temporarily twisted.

When the electronic book 1 is twisted in this manner, there may be a possibility that the touch panel 2 held by the cover body 4 is broken or a position of the touch panel 2 relative to the display panel 7 is displaced.

When the position of the touch panel 2 is displaced in the above-mentioned manner, even when the user touches a portion of the touch panel 2 corresponding to a predetermined position of an operation screen, there exists a possibility that the control part 6 of the electronic book 1 cannot execute a desired control.

To obviate such a possibility, according to the electronic book 1 of this embodiment, by improving the mounting structure of the touch panel 2 on the upper cover body 4a, a strength of the upper cover body 4a against a force applied in a twisting direction is enhanced.

In the electronic book 1, as shown in FIG. 2, on a brim portion of the open portion 3 where the touch panel 2 of the upper cover body 4a is mounted and held, a thick wall portion 8 having a large thickness M compared to a thickness m of a portion around the thick wall portion 8 and a mounting portion 9 on which an edge peripheral portion of the touch panel 2 is mounted are formed.

That is, in this embodiment, by setting the thickness M of the thick wall portion 8 larger than the thickness m of the portion around the thick wall portion 8, on the brim portion of the open portion 3 of the upper cover body 4a, the thick wall portion 8 which reinforces the open portion 3 and the annular mounting portion 9 which holds an edge surface of the edge peripheral portion of the touch panel are formed. In FIG. 2, symbol 11 indicates a buffer material which is interposed between the mounting portion 9 and the edge peripheral portion of the display panel 7.

In this embodiment, a size (area) of the open portion is set to 141.425×205 mm², the thickness M of the thick wall portion 8 is set to 2.2 mm, the thickness m of the portion around the thick wall portion 8 is set to 1.5 mm, and a thickness of the touch panel 2 is set to 0.7 mm.

In this manner, by forming the thick wall portion 8 having the larger thickness than the portion around the thick wall portion 8 and the mounting portion 9 in the open portion 3 of the upper cover body 4a, the strength of the upper cover body 4a against the force applied in a direction that the open portion 3 is twisted can be enhanced and hence, the touch panel 2 is hardly curved by a mechanical load from the outside thus preventing breaking of the touch panel 2.

Further, in this electronic book 1, a flange is formed on an upper portion of the edge peripheral portion of the touch panel 2 and, at the same time, a support portion 10 which supports a lower surface of the flange of the touch panel 2 from below is formed on the mounting portion 9 formed on the upper cover body 4a.

That is, in this embodiment, as shown in FIG. 2, the brim portion of the open portion 3 is formed in an L shape as viewed in cross section.

In this manner, by forming the support portion 10 which supports a lower surface of the edge peripheral portion of the touch panel 2 on the mounting portion 9 from below, a mechanical strength against a force applied from an upper surface side of the touch panel 2 can be enhanced.

In this embodiment, the flange is formed on the upper portion of the edge peripheral portion of the touch panel 2, and the lower surface of the flange is supported by the support portion 10 of the mounting portion 9 from below. However, the touch panel 2 may be formed in a simple planer shape without forming the flange on the touch panel 2, and the edge peripheral portion may be supported by the support portion 10 of the mounting portion 9 from below.

Due to such constitution, time and efforts for forming the edge peripheral portion of the touch panel 2 in the above-mentioned L shape may be omitted and hence, a manufacturing cost of the electronic book 1 can be reduced.

Further, in this electronic book 1, to make a surface (upper surface) of the upper cover body 4a and a surface (upper surface) of the touch panel 2 become coplanar with each other, the touch panel 2 is mounted on the upper cover body 4a.

Due to such constitution, this embodiment can improve the aesthetic appearance of the electronic book 1 and, at the same time, this embodiment can prevent breaking of the electronic book 1 even when a foreign substance is caught between the touch panel 2 and the upper cover body 4a or the like.

In this embodiment, as described above, the brim portion of the open portion 3 on which the touch panel 2 of the upper cover body 4a is mounted is formed in an L shape in cross section. However, the shape of the brim portion of the open portion 3 in this embodiment is not limited to the above-mentioned L shape, and the brim portion of the open portion 3 may be modified in any arbitrary shape provided that the shape allows the thick wall portion 8 to have the thickness M larger than the thickness m of the upper cover body 4a of the portion around the thick wall portion 8 and can enhance a strength against a force applied in a twisting direction.

Here, modifications of the shape of the brim portion of the open portion 3 are explained in conjunction with FIG. 3A and FIG. 3B. In FIG. 3A and FIG. 3B, constitutional parts substantially equal to the corresponding to constitutional parts of the electronic book 1 explained in conjunction with FIG. 1 and FIG. 2 are explained by giving same symbols to these constitutional parts.

The basic structure of the electronic book 1a according to one modification is substantially equal to the basic structure of the electronic book 1 shown in FIG. 2, and the electronic book 1a according to this modification differs from the electronic book 1 shown in FIG. 2 only with respect to the structure in the vicinity of the open portion 3 in which the touch panel 2 of the cover body 4 is mounted. Accordingly, the structure of the electronic book 1 in the vicinity of the open portion 3 in which the touch panel 2 is mounted is explained.

As shown in FIG. 3A, a brim portion of the open portion 3 formed on the upper cover body 4a of the electronic book 1a according to this modification includes, in the same manner as the brim portion of the open portion 3 shown in FIG. 2, a thick wall portion 8a having a thickness M larger than a thickness m of a portion around the thick wall portion 8a and a mounting portion 9a on which the touch panel 2 is mounted, and a strength of the electronic book 1a against a force applied in a twisting direction is enhanced by such a thick wall portion 8a.

Particularly, the mounting portion 9a according to this modification includes a recessed portion 13 in which the end peripheral portion of the touch panel 2 is fitted. That is, as shown in FIG. 3A, the mounting portion 9a is formed in a lateral U shape in cross section.

Accordingly, in the electronic book 1a of this embodiment, when the touch panel 2 is mounted on the upper cover body 4a, upper and lower surfaces of the edge peripheral portion of the touch panel 2 is sandwiched by inner surfaces of the recessed portion 13 formed in the mounting portion 9a and hence, a holding strength of the touch panel 2 by the upper cover body 4a is enhanced compared to the electronic book 1 shown in FIG. 2 thus favorably preventing the occurrence of positional displacement of the touch panel 2 relative to the display panel 7.

Further, in the modification shown in FIG. 3A, a planar touch panel 2 is used as the touch panel 2 and hence, a surface of the upper cover body 4a and a surface of the touch panel 2 are not made coplanar with each other. However, by forming a shape of the edge peripheral portion of the touch panel 2, as in the case of the electronic book 1b shown in FIG. 3B, a surface (upper surface) of an upper cover body 4a and a surface (upper surface) of a touch panel 2 may be formed coplanar with each other.

That is, to make the surface (top surface) of the upper cover body 4a having a recessed portion 13 in a mounting portion 9a thereof and a surface (top surface) of the touch panel 2 coplanar with each other, as shown in FIG. 3B, a flange is preliminarily formed on a lower portion of the end periphery of the touch panel 2.

Here, a thickness of a portion of the touch panel 2 above the flange and a thickness of the upper cover body 4a at a portion thereof above the recessed portion 13 are set equal to each other.

By forming the touch panel 2 in such a shape, as shown in FIG. 3B, it is possible to make the surface (upper surface) of the upper cover body 4a and the surface (upper surface) of the touch panel 2 become coplanar with each other.

By forming the electronic book 1b in such a shape, in the same manner as the electronic book 1 shown in FIG. 2, this embodiment can improve the aesthetic appearance of the electronic book 1b and, at the same time, can prevent breaking of the electronic book 1b when a foreign substance is caught between the touch panel 2 and the upper cover body 4a or the like.

Figure 4A:
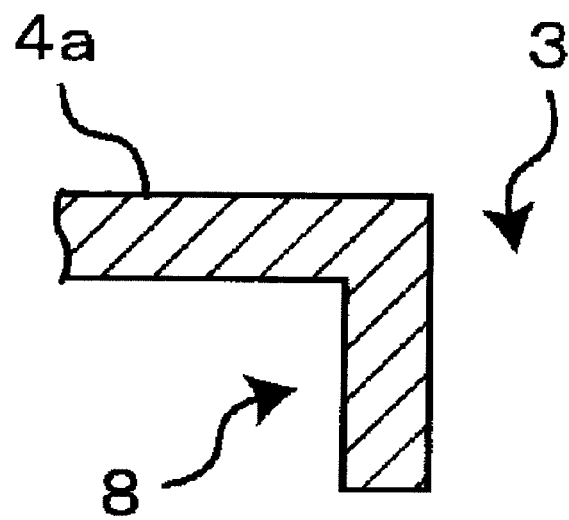
FIG. 4A to FIG. 4I are cross-sectional explanatory views showing some of the manufacturing steps of the display device according to this embodiment.

Here, a manufacturing method of the electronic book according to this embodiment is explained in conjunction with FIG. 4A. That is, mounting steps of the touch panel in manufacturing steps of the electronic book are explained.

In manufacturing the electronic book in which the brim portion of the open portion 3 of the upper cover body 4a has an L shape in cross section as shown in FIG. 2, as shown in FIG. 4A, at the brim portion of the open portion 3, the upper cover body 4a having the thick wall portion 8 extending downwardly toward a side below the open portion 3 and the planar touch panel 2 are prepared.

Here, as the upper cover body 4a, an upper cover body 4a which is formed using a heat-soluble material having high impact resistance such as polyethylene terephthalate (PET), polycarbonate (PC) is prepared. Further, the touch panel 2 which is formed of the same material as the upper cover body 4a is prepared.

Figure 4B:
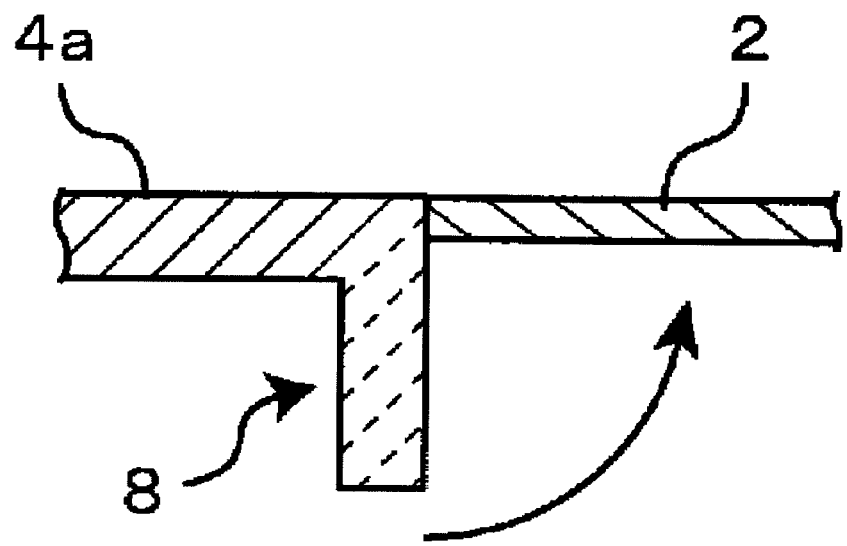

Then, in mounting the touch panel 2 on the upper cover body 4a as shown in FIG. 4B, the touch panel 2 is fitted in the open portion of the upper cover body 4a.

Here, the upper cover body 4a and the touch panel 2 are aligned with each other in the vertical direction such that the upper surface of the touch panel 2 and the upper surface of the upper cover body 4a become coplanar with each other.

Then, by selectively heating the thick wall portion 8 which extends downwardly to a side from the open portion 3 of the upper cover body 4a, this thickness wall portion 8 is melted. In FIG. 4, a region which is hatched with a broken line is a portion melted by heating.

Figure 4C:
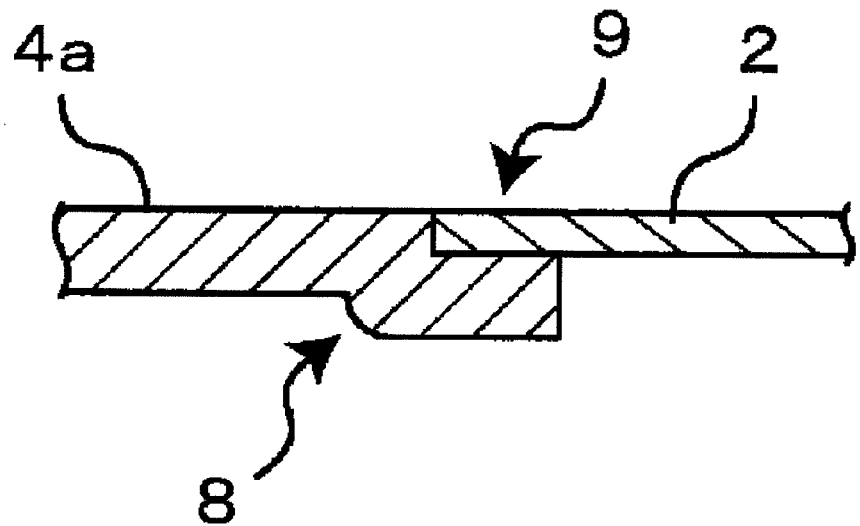

Thereafter, as shown in FIG. 4C, by bending by pushing the thick wall portion 8 which is melted by heating toward a touch panel 2 side, an upper surface of the thick wall portion 8 is brought into contact with a lower surface of the edge peripheral portion of the touch panel 2 and, thereafter, the thickness wall portion 8 is cured by cooling. Here, a portion of the brim portion of the open portion 3 which is brought into contact with a lower surface of the edge peripheral portion of the touch panel 2 forms the mounting portion 9.

Here, the edge peripheral portion of the touch panel 2 and the mounting portion 9 are welded to each other as follows. The heated thick wall portion 8 is brought into contact with a lower surface of the edge peripheral portion of the touch panel 2 so as to melt the lower surface of the edge peripheral portion of the touch panel 2. Thereafter, the thick wall portion 8 and the lower surface of the edge peripheral portion of the touch panel 2 are cured by cooling.

In this manner, according to this embodiment, in mounting the touch panel 2 on the upper cover body 4a, the edge peripheral portion of the touch panel 2 and the brim portion of the open portion 3 of the upper cover body 4a are welded to each other and hence, an adhesive force between the touch panel 2 and the cover body 4 is enhanced so that the mechanical strength of the electronic book can be further enhanced.

Further, as described above, in this embodiment, both of the touch panel 2 and the upper cover body 4a are formed using the same material and hence, the touch panel 2 and the upper cover body 4a can be integrally formed at a molten portion of the touch panel 2 and the upper cover body 4a whereby the mechanical strength of the electronic book can be further enhanced.

In this embodiment, the thick wall portion 8 of the upper cover body 4a is preliminarily heated and melted such that the thick wall portion 8 has the thickness larger than the portion around the thick wall portion 8. However, both of the thick wall portion 8 of the upper cover body 4a and the lower surface side of the edge peripheral portion of the touch panel 2 may be heated together and, thereafter, a molten portion of the thick wall portion 8 may be bent by pushing toward a touch panel 2 side.

Due to such an operation, the upper cover body 4a and the touch panel 2 can be welded to each other more favorably.

Next, the explanation is made with respect to a case in which the electronic book 1a having the mounting portion 9a in which the recessed portion 13 having an approximately lateral U shape in cross section shown in FIG. 3 is manufactured. In this case, as shown in FIG. 4D, the upper cover body 4a is prepared in a state that a rectangular cylindrical thick wall portion 8a which surrounds the open portion 3 is formed on a lower surface of the upper cover body 4a.

Figure 4D:
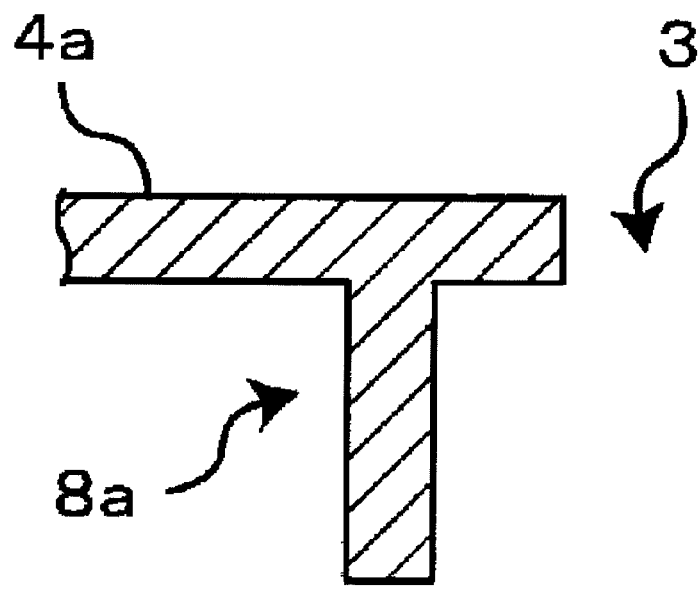

With respect to the upper cover body 4a, by setting a cross-sectional area of a rectangular cylindrical hollow portion of the thick wall portion 8a larger than an area of the open portion 3, the upper cover body 4a is formed such that the upper cover body 4a has a T shape in cross section in the vicinity of the edge portion of the open portion 3 as shown in FIG. 4D, that is, the thick wall portion 8a is positioned outside the open portion 3 from an edge portion of the open portion 3 by a predetermined length in cross section.

Figure 4E:
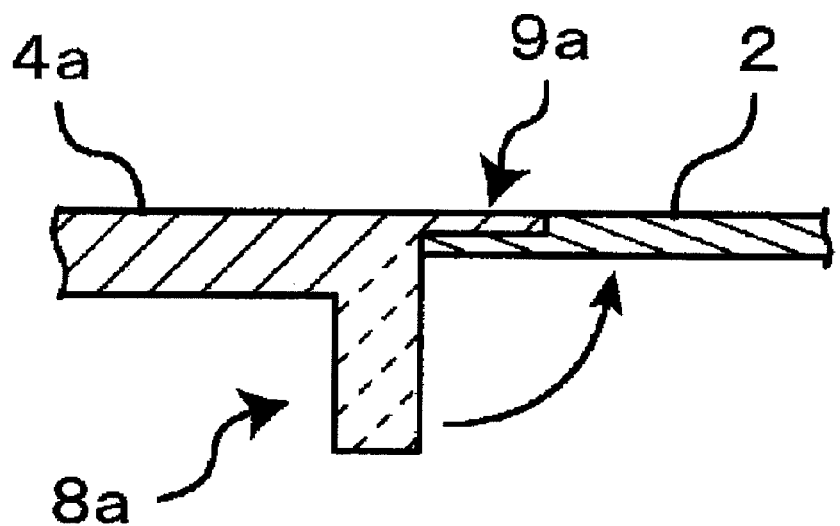

Next, as shown in FIG. 4E, the touch panel 2 which forms the flange on the lower portion of the edge peripheral portion is fitted in the open portion 3 from a lower surface side of the upper cover body 4a. Also in such an electronic book, both of the upper cover body 4a and the touch panel 2 are formed using a heat soluble resin material having high impact resistance.

Further, a shape of the edge peripheral portion of the touch panel 2 is preliminarily formed so as to make the upper surface of the touch panel 2 become coplanar with the upper surface of the upper cover body 4a when the touch panel 2 is fitted in the open portion 3.

Next, by selectively heating the thick wall portion 8a, the thick wall portion 8a is melted. Then, by bending the thick wall portion 8a melted by heating toward a touch panel side by pushing, the upper surface of the thick wall portion 8a is brought into contact with the lower surface of the edge peripheral portion of the touch panel 2. Thereafter, the thick wall portion 8a is cured by cooling.

Figure 4F:
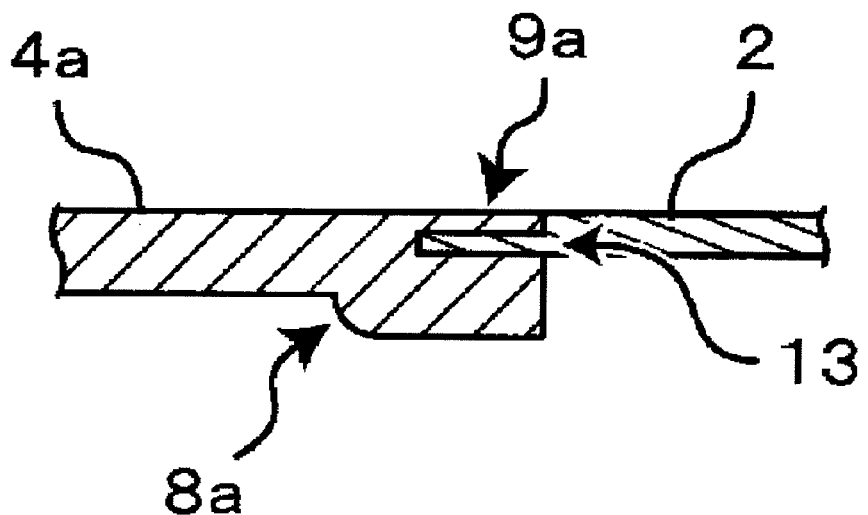

By bending the thick wall portion 8a toward the touch panel 2 side by pushing in this manner, as shown in FIG. 4F, the recessed portion 13 in which the edge peripheral portion of the touch panel 2 is fitted is formed in the mounting portion 9a and hence, the flange portion of the touch panel 2 is sandwiched by the recessed portion 13.

Here, by bringing the heated thick wall portion 8a into contact with the lower surface of the edge peripheral portion of the touch panel 2, the lower surface of the edge peripheral portion of the touch panel 2 is melted. Thereafter, the thick wall portion 8a is cured by cooling so that the thick wall portion 8a is welded to the mounting portion 9a.

Also in this manufacturing step, both of the thick wall portion 8a of the upper cover body 4a and the lower surface side of the edge peripheral portion of the touch panel 2 may be heated together and, thereafter, a molten portion of the thick wall portion 8a may be bent toward a touch panel 2 side by pushing.

Due to such an operation, in the same manner as the electronic book shown in FIG. 4C, the upper cover body 4a and the touch panel 2 can be welded to each other more favorably.

Further, the method of mounting the touch panel 2 on the upper cover body 4a is not limited to the method shown in FIG. 4A to FIG. 4C and the method shown in FIG. 4D to FIG. 4F. That is, any method can be used provided that the edge peripheral portion of the touch panel 2 is welded to the brim portion of the open portion 3 of the upper cover body 4a while melting the brim portion of the open portion 3 of the upper cover body 4a such that the brim portion has the thickness larger than the thickness of the portion around the brim portion.

Figure 4G:
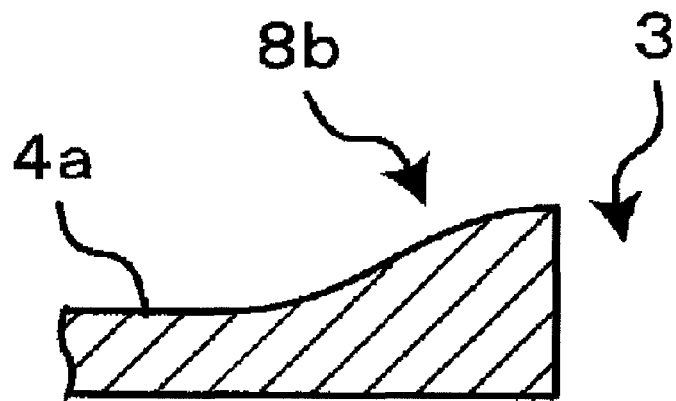

For example, as shown in FIG. 4G, an annular thick wall portion 8b which is formed with a large thickness is formed on the brim portion of the open portion 3 of the upper cover body 4a, and the thick wall portion 8b is melted by heating.

Figure 4H:
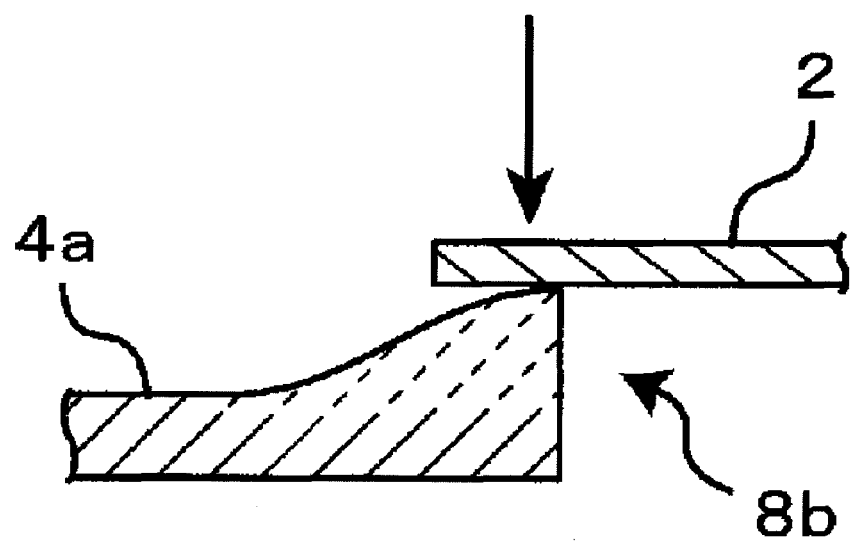

Next, as shown in FIG. 4H, the edge peripheral portion of the touch panel 2 is brought into contact with the upper surface of the molten thick wall portion 8b so as to allow the touch panel 2 to close the open portion 3.

Figure 4I:
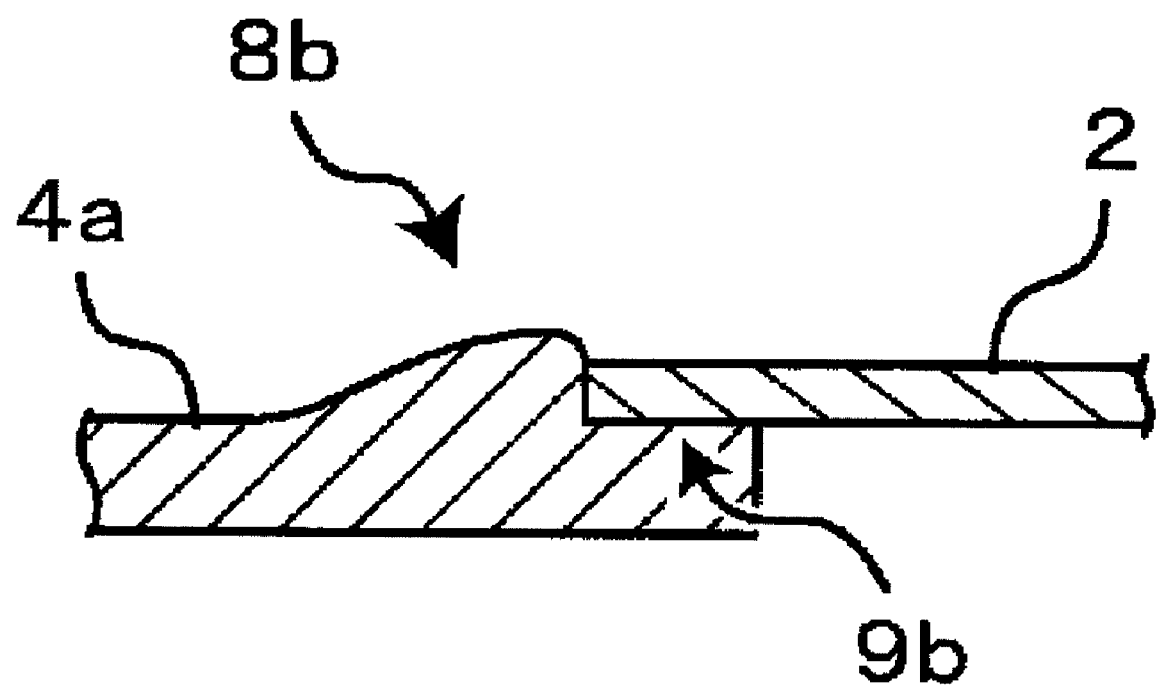

Then, as shown in FIG. 4I, the edge peripheral portion of the touch panel 2 is embedded into the molten thick wall portion 8b by pushing the touch panel 2 downwardly thus mounting the touch panel 2 on the upper cover body 4a. Here, a contact portion of the brim portion of the open portion 3 formed in the upper cover body 4a with the lower surface of the edge peripheral portion of the touch panel 2 forms the mounting portion 9b.

With the use of such a method, in mounting the touch panel 2 on the upper cover body 4a, an operation for bending the thick wall portion 8b toward the touch panel 2 side by pushing becomes unnecessary and hence, the mounting steps of the touch panel 2 can be simplified.

In this embodiment, as described above, the brim portion of the open portion 3 of the upper cover body 4a on which the touch panel 2 is mounted is formed with the large thickness and hence, it is possible to prevent twisting and deflection of the cover body 4.

In general, a deflection quantity of a plate body is expressed by a following formula, wherein σ is deflection, P is stress, L is length, E is Young's modulus, and I is moment of inertia of area.

$$\sigma = (P \cdot L^3)/(48 \cdot E \cdot I)$$

To decrease the deflection quantity, it is necessary to increase the moment of inertia of area. Here, a formula of moment of inertia of area is expressed as follows, wherein b is a cross-sectional width and D is a cross-sectional height.

$$I = (b \cdot D^3)/12$$

Accordingly, the increase of the cross-sectional height is effective to increase the moment of inertia of area.

Accordingly, in the display device of this embodiment, it is preferable to set the cross-sectional height (D=M) of the open portion 3 is preferably set to a sum of m+a thickness of the touch panel or more.

What is claimed is:
1. A display device comprising:
a display panel;
a touch panel mounted on a front-surface side of the display panel; and
a cover body that includes an upper surface and an open portion formed in the upper surface,
wherein the upper surface of the cover body comprises:
a mounting portion, on which an edge peripheral portion of the touch panel is mounted, that is formed on a brim portion of the open portion and that has a first thickness,
a surrounding portion around the mounting portion that has a second thickness, and
a thick wall portion between the mounting portion and the surrounding portion that has a third thickness that is greater than the first thickness and that is greater than the second thickness.

2. A display device according to claim 1, wherein the mounting portion has a support portion which supports a lower surface of the edge peripheral portion of the touch panel from below.

3. A display device according to claim 1, wherein the mounting portion has a recessed portion in which the edge peripheral portion of the touch panel is fitted.

4. A display device according to claim 1, wherein the touch panel has the edge peripheral portion thereof welded to the brim portion of the upper surface of the cover body.

5. A display device according to claim 4, wherein both of a material of the cover body and a material of the touch panel are the same material.

6. A display device according to claim 1, wherein the touch panel is mounted on the cover body such that the upper surface of the cover body and an upper surface of the touch panel become coplanar with each other.

7. A cover body of a display device comprising an open portion in which the touch panel is mounted is formed in an upper surface of the cover body, such that the open portion overlaps with a display region of the display panel, wherein the upper surface of the cover body comprises:

a mounting portion, on which an edge peripheral portion of the touch panel is mounted, that is formed on a brim portion of the open portion and that has a first thickness, a surrounding portion around the mounting portion that has a second thickness, and a thick wall portion between the mounting portion and the surrounding portion that has a third thickness that is greater than the first thickness and that is greater than the second thickness.

8. A manufacturing method of a display device comprising the steps of:

mounting a touch panel in an open portion of a cover body, such that the touch panel is mounted on a surface of a display panel;

welding the touch panel to a brim portion of the open portion of the cover body while melting the brim portion of the open portion, such that the brim portion has a greater thickness than a portion around the brim portion.

* * * * *